United States Patent [19]

Bähr

[11] 4,168,236
[45] Sep. 18, 1979

[54] CONSECUTIVE, INDEPENDENT DEWATERING APPARATUS FOR IMPROVED SLUDGE TREATMENT

[76] Inventor: Albert Bähr, Parallelstrasse 2A, D-6683 Elversberg, Saar, Fed. Rep. of Germany

[21] Appl. No.: 863,894

[22] Filed: Dec. 23, 1977

Related U.S. Application Data

[63] Continuation of Ser. No. 632,689, Nov. 17, 1975, abandoned.

[30] Foreign Application Priority Data

Mar. 7, 1975 [DE] Fed. Rep. of Germany ....... 2510010

[51] Int. Cl.² .............................................. B01D 33/04
[52] U.S. Cl. .................... 210/294; 100/118; 100/121; 100/152; 100/154; 210/386; 210/400
[58] Field of Search .................. 210/65, 73, 170, 294, 210/297, 330, 519, 526, 350, 386, 400, 401, 402, 513, 523, 77; 198/153; 43/6.5; 37/69, 70; 209/255, 259, 272, 307, 308; 100/110, 111, 116, 118, 120, 121, 126, 131, 151, 152, 153, 154; 162/368

[56] References Cited

U.S. PATENT DOCUMENTS

| Re. 21,723 | 2/1941 | Thompson | 100/154 |
| 578,807 | 3/1897 | Barr et al. | 210/400 X |
| 1,946,663 | 2/1934 | Behnke | 210/523 X |
| 3,273,494 | 9/1966 | Cocchiarella | 100/121 |
| 3,531,404 | 9/1970 | Goodman et al. | 210/400 |
| 3,605,607 | 9/1971 | Guyer | 100/154 |
| 3,699,881 | 10/1972 | Levin | 100/118 |
| 3,743,100 | 7/1973 | Bahr | 100/118 |
| 3,800,952 | 4/1974 | Bastgen | 100/118 |
| 3,896,030 | 7/1975 | Bahr | 100/118 |
| 3,897,341 | 7/1975 | Ozawa | 210/401 |

*Primary Examiner*—Theodore A. Granger
*Attorney, Agent, or Firm*—Stevens, Davis, Miller & Mosher

[57] ABSTRACT

Apparatus is provided for the continuous treatment of sludge, which is made possible through the advantageous combination of at least two independent dewatering steps at consecutively higher pressures and increased dwell time. In a preferred embodiment there is provided a three stage process where there is a first dewatering at the pressure provided by gravity action, the sludge being strained through continuous filter pockets; a second moderate pressure stage with a drum filter press; and a third higher pressure stage.

17 Claims, 20 Drawing Figures

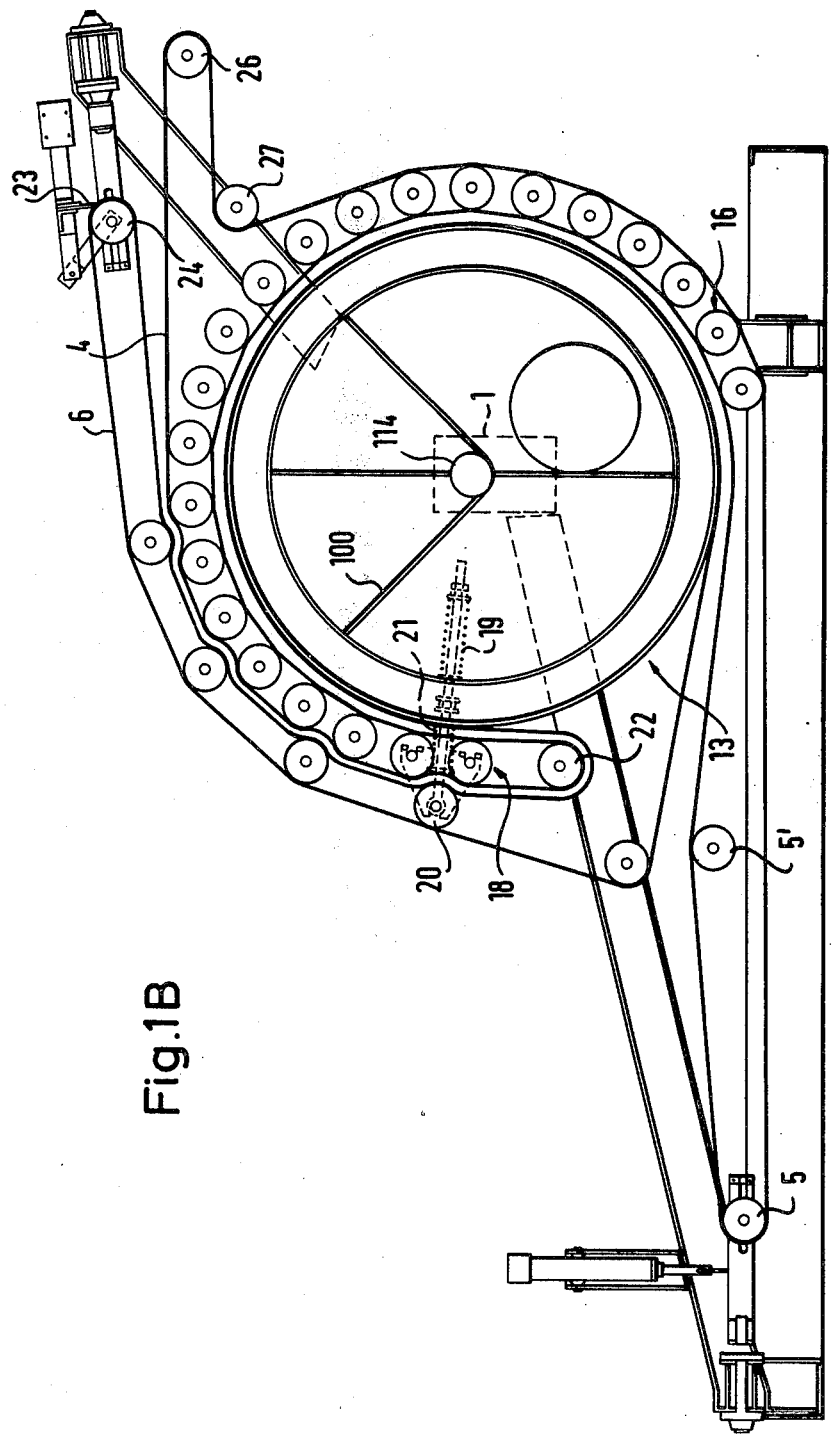

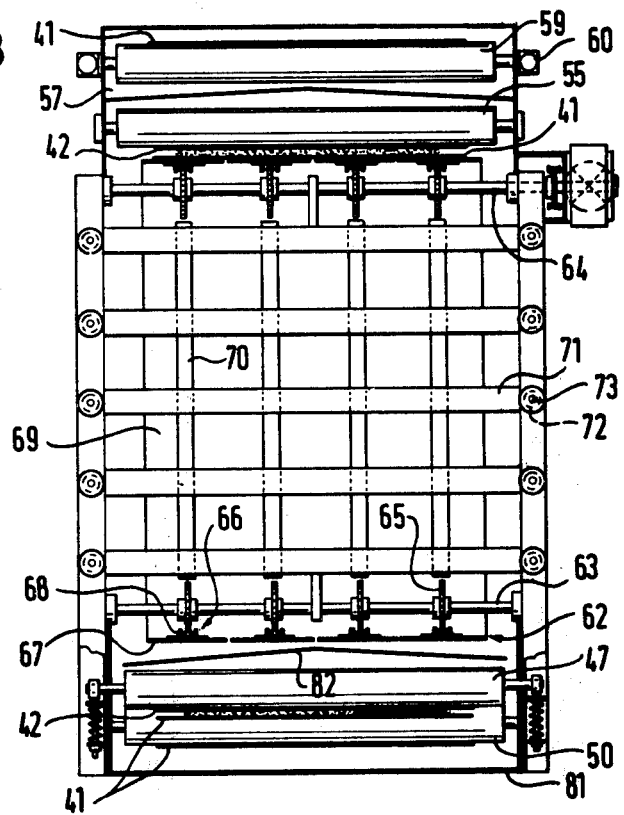
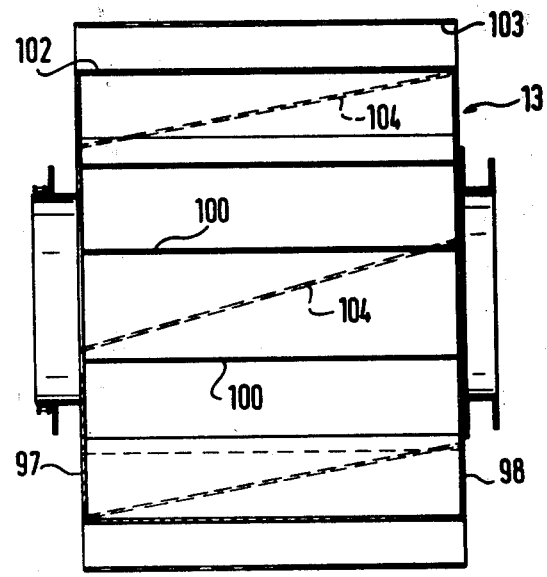

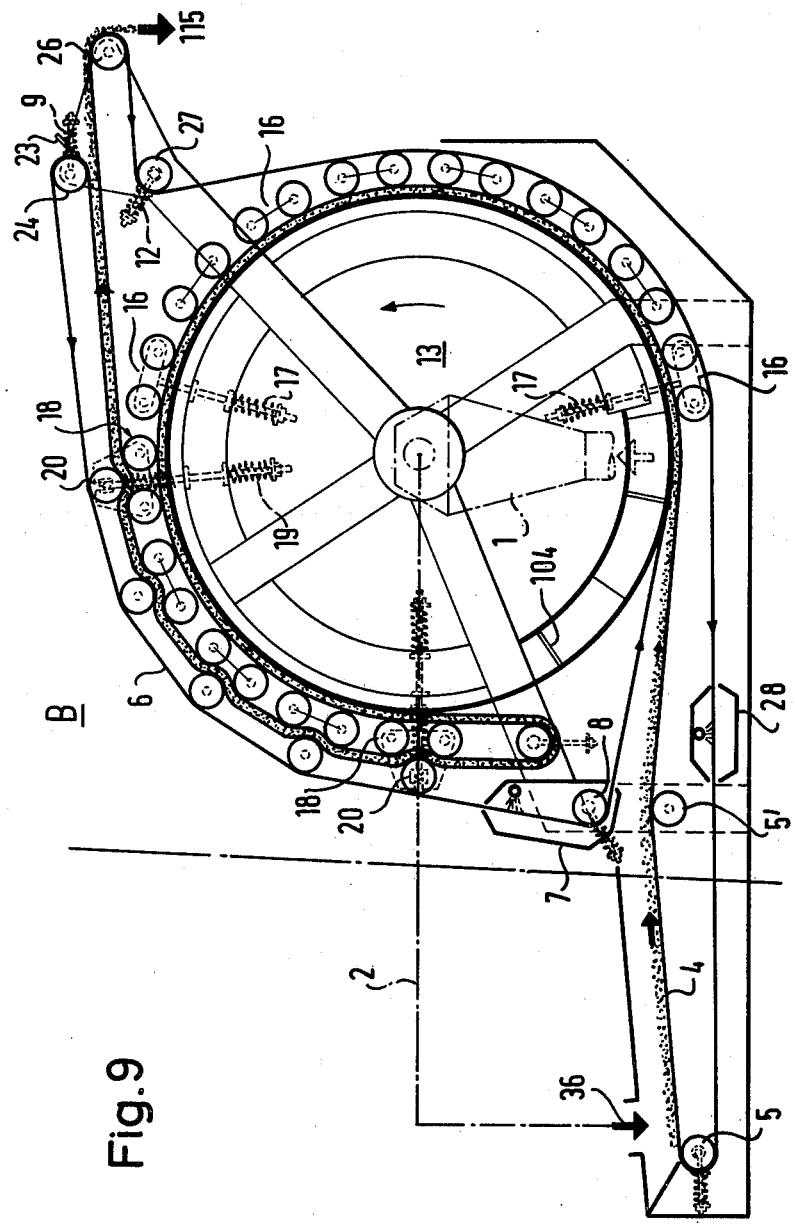

CONSECUTIVE, INDEPENDENT DEWATERING APPARATUS FOR IMPROVED SLUDGE TREATMENT

This is a Continuation of application Ser. No. 632,689 filed Nov. 17, 1975, now abandoned.

BACKGROUND OF THE INVENTION

With the ever increasing awareness of pollution problems in contemporary society, and with the ever increasing volume of waste products which forms a natural byproduct of growth in the industrialized world, there have been ever increasing demands placed upon the requirements of new sewage treatment plants, and also demands for improvement of existing systems. In my patents U.S. Pat. No. 3,743,100, dated July 3, 1973, entitled FILTER PRESS, MORE PARTICULARLY FOR DEWATERING SLUDGE IN SEWAGE TREATMENT PLANTS, and U.S. Pat. No. 3,896,030, dated July 22, 1975, entitled identically to the first mentioned patent, I have described certain filter press systems to be advantageously used for the facilitation of sludge treatment. In the latter U.S. Pat. No. 3,896,030, I have also discussed a dewatering system which has been based on the principle of simply straining sludge through the action of gravity. It was pointed out in the U.S. Pat. No. 3,896,030 that various known filter presses possess a preliminary dewatering section, which is essentially a straining system, while in other cases the material on the filter belt is first squeezed between pressure rollers, prior to treatment on a rotary drum system. The filter press dewatering means described in this prior art in the U.S. Pat. No. 3,896,030 have the disadvantage that filtering efficiency is comparatively low, the construction relatively complex, and the space occupied by the machine is relatively great. In my U.S. Pat. No. 3,896,030 there is described a new dewatering means which has a pretreatment system, whereby the sludge, prior to reaching the rotary belt is pressed between two filter belts, with a filter belt acting as a strainer. Thus, through the action of gravity an appreciable amount of the water is removed, thus reducing the total water content of the sludge prior to entering the rotary drum system. In my copending patent application, Bahr, U.S. Ser. No. 632,789, now abandoned, entitled SLUDGE PRETREATMENT DEWATERING BASED UPON A CONTINUOUS SYSTEM OF FILTER POCKETS, filed on even date herewith, there is described an advantageous method for partially dewatering sludge prior to treatment of the sludge in a conventional filter press. This system in part serves to improve existing sludge treatment systems, and this system of said copending patent application may be incorporated into the method and apparatus of the present invention.

Sludges may also be dewatered through the use of tower presses, in which two filter belts are pressed vertically, one against the other, both belts being used in this filtering process. It should be noted that a totally satisfactory result is not attained through this alternative method to the filter press methods which have been described in the prior art, and referred to in said copending application.

With respect to the evolution of drum filter press techniques, although there have been efforts made in this area it has been found that when only one filter belt is used for all the phases of dewatering, that the mesh size of such belt must be designed for the highest pressure which is used in the process; otherwise, the filtrate which is the result of this process is heavily soiled. To be sure, the general condition of sludge alters as it goes through such a press in accordance with the quantity of the water which is removed from the sludge. Corresponding to the overall condition of the sludge, one would better choose at each point in time during the overall process optimum conditions of the filter size, the pressure and pressing time, and other parameters related to the general condition of the sludge. It can be seen that such control is desirable as the applicant has seen that with typical drum filter presses the water is first expelled but then is sucked back into the sludge when the pressure is cut off, leading to the conclusion that the practially feasible end product solids contents is not achieved. The failure to be able to regulate such parameters as time and pressure at the individual steps in the change of the sludge condition in the dewatering processes is thus detrimental to achieving an optimum result.

SUMMARY OF THE INVENTION

In its generic aspect, the present invention provides both a method and apparatus for dewatering sludge, which comprises consecutive dewatering steps which are independent of each other, particularly providing for different speeds of the sludge through the systems, e.g., where the separate systems of the present invention are used in combination they treat the sludge at varying speeds, and the relative pressure on the sludge is increased in consecutive stages. While the pressure is increased as the stages go by, the speed of passage of the sludge is decreased stagewise.

In accordance with a preferred method of the present invention, three stages are used, with the first stage being a pressure-free dewatering stage, the dewatering depending on the force of gravity to force the aqueous portion of the sludge through a filter system; the second stage being of a relatively greater pressure; and the third stage being of a still higher pressure.

In accordance with the invention in yet another preferred embodiment a method and apparatus are provided by which the sludge is dewatered in two stages, a first pressureless stage and a second high pressure stage.

In accordance with yet another preferred embodiment of the invention, a method and apparatus are provided by which the sludge is dewatered in two stages, a first medium pressure stage and a second high pressure stage.

In accordance with another preferred aspect of the invention, there is a method and apparatus provided for the three stage dewatering process, at ever increasing pressures and ever decreasing time periods for each stage.

It should be noted that although the generic aspect in one was relates to the new combination of successive applications of dewatering treatments, there are individual elements and subcombinations herein which form an invention in their own right.

For example, it was heretofore necessary in the treatment of sludge to use a drum filter press of a relatively complex construction, when one wanted to use a drum filter press for sludge treatment. Now, with the added benefit of the combination, it is possible to use a much simpler and therefore less expensive drum filter press in the combined process.

The high pressure stage utilizing at least two endless rotating platen belts which are pressurized towards engagement with each other, and having two endlessly rotating filter belts extrending throughbetween these platen belts, in accordance with the description which follows, also represents a new system in itself.

In the art of drum filter press techniques, the applicant has discovered yet another advantageous refinement in this art, the incorporation of the flocculant-sludge mixing chamber within the drum itself.

BRIEF DESCRIPTION OF THE DRAWINGS

FIG. 1B shows a middle pressure stage of the embodiment of FIG. 1;

FIG. 7 is a partly fragmented sectioned view of the drum of FIG. 6;

FIG. 8 is a sectioned view on the line VIII—VIII of FIG. 1;

FIG. 9 is a side elevation of a preferred embodiment of the drum filter press forming the medium pressure stage;

DETAILED DESCRIPTION OF THE INVENTION

Figure 1:
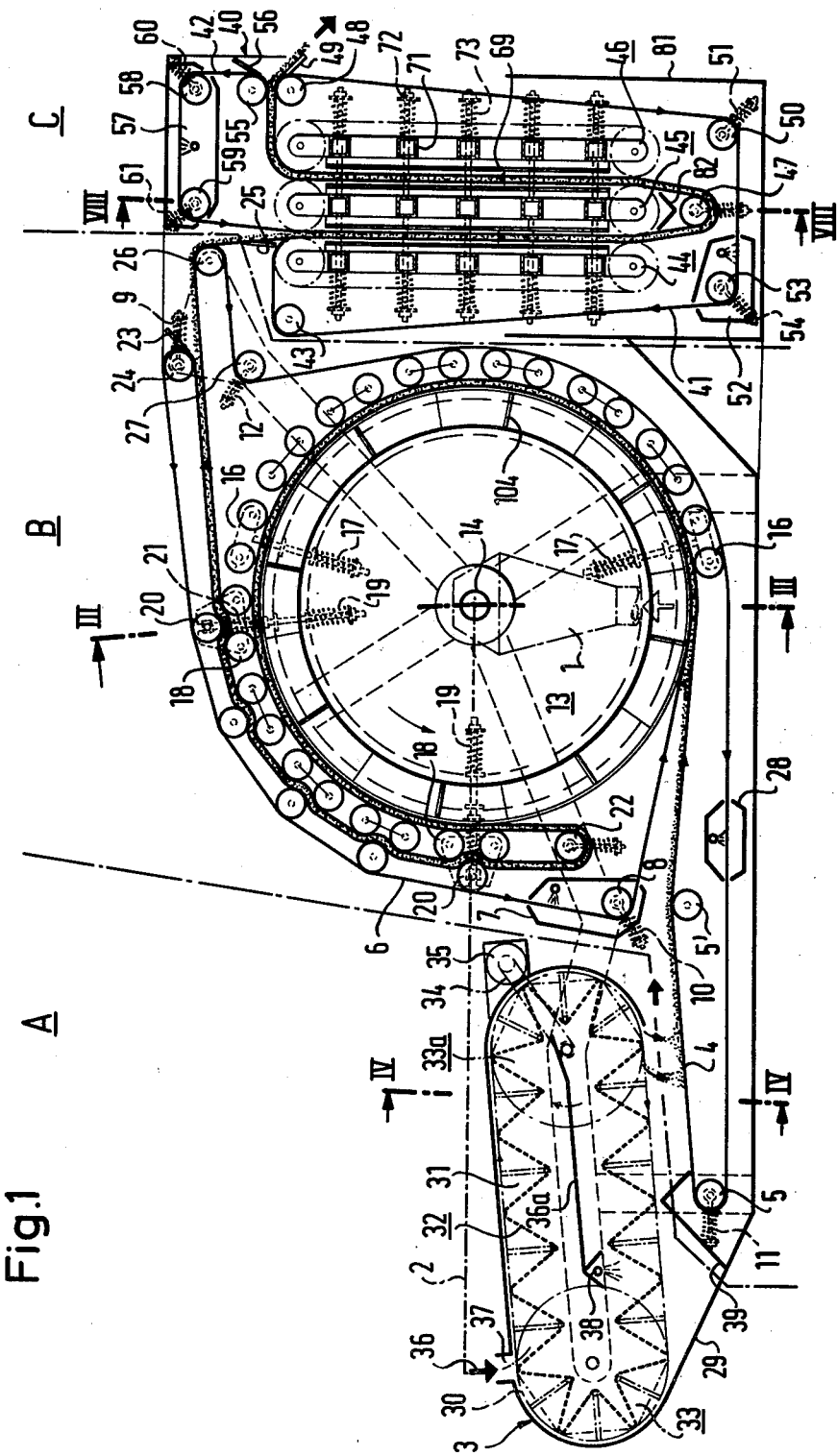
FIG. 1 is a diagrammatic sectioned side elevation of one embodiment in accordance with the invention; in a three-stage extensible stage.
Figure 1A:
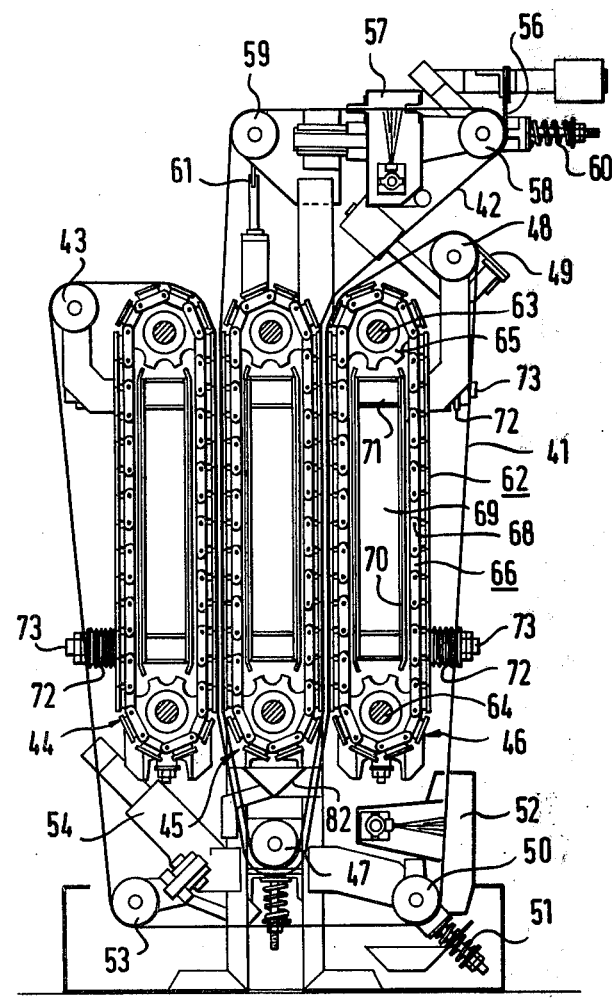
FIG. 1A is a more detailed view of the high pressure stage of FIG. 1.

A particular advantage provided by the invention is that each of the independent dewatering phases cooperating with one another represents an independent and independently operating and controllable dewatering unit which can adapt properly to the existing overall condition of the sludge. For instance, the pressureless stage can have filtering specially designed for the stage—i.e., in the case of pressureless dewatering the filter will have a very large mesh. The filter used in the medium-pressure dewatering phase embodied by the drum filter press will have a correspondingly smaller mesh, while the filter belt of the high-pressure stage will have the smallest mesh size.

Another advantage provided by the process and apparatus according to the invention is that the feature of using a special dewatering unit or stage having a special filter belt makes it possible for the first time to have the optimum belt speed in each individual stage; the optimum belt speed depends upon the quantity which still remains to be dewatered—i.e., belt speeds can be differentiated to suit the respective total quantities of sludge remaining in each stage after the respective dewatering. Also, each individual stage can have pressing means, such as rollers or plates or platens or the like, which are particularly suitable for the overall condition of the sludge in such stage, to ensure the best form of pressing in such stage. Another advantage provided by the invention is that separating the dewatering stages means that the sludge in each individual stage can be adjusted to any required optimum layer thickness by variation of the belt speed in such stage. Also, in the case of a three-stage process, three such stages can be combined as required, the stages being associated with one another in accordance with the kind of sludge and with requirements. For instance, a readily dewaterable sludge having a high solids content will require only the medium pressure dewatering using the drum filter press; alternatively, such dewatering can be combined in such a case with a simplified form of pressureless preliminary dewatering. A readily dewaterable sludge having low solids contents will always be dewatered by pressureless preliminary dewatering combined with drum dewatering. A difficulty dewaterable sludge which has a high solids content in the as-supplied state and which it is required to deliver with a very high end solids content is treated by a combination of drum dewatering and high-pressure dewatering. A sludge which has a low solids content and which is required to be discharged after extensive dewatering will be dewatered, for instance, by a three-stage treatment. Also, the high-pressure dewatering stage construction forming the feature of various subclaims can, in accordance with available investment finance, can be expanded as required as a final stage if a delivered sludge having very high solid contents is required; in such a case a number of such high-pressure stages can be provided in series. Such a step increases the uniform pressing time given in the final stage, and so the extent of dewatering is affected correspondingly. The high-pressure plate or platen dewatering to be described in detail hereinafter can provide substantially the same effect as can at present be provided by the known intermittently operated chamber filter presses, which are very expensive and very complicated dewatering facilities. In the light of the solids contents obtainable, the high-pressure stage proposed in accordance with the invention could be called a continuously operating chamber filter press; a disadvantage of the known chamber filter press is the fact that it is an intermittently operating device. Of course, chamber filter presses are costly devices only because they have to take over a low solids contents sludge right in the initial phase, whereafter the sludge has to be given the various phases of dewatering treatment, its overall condition altering correspondingly, in a single unit. However, when the sludge entering such a press is already in an overall condition such that it has ceased to be flowable, as is the case e.g. when it has from approximately 30 to 35% solids content, complicated sealing of a high-pressure pressing zone becomes unnecessary. According to this invention, the sludge is so treated in the first two stages, e.g. of pressureless pocket dewatering and of medium-pressure drum dewatering that its overall condition at entry into the high-pressure dewatering stage enables it to be pressed at high pressure without difficulties arising as regards sealing.

Another advantage of the invention is that the filtrate expressed from the sludge is yielded separately in the various stages. Clearly, the dry-substance content of the filtrates varies in the various stages; the pressureless pocket dewatering phase yields a substantially solids-free filtrate, the medium-pressure drum treatment yields a poorer filtrate having a higher solids content, and the worst filtrate is yielded by the high-pressure plate or platen dewatering stage. To take a practical example, the quantities of filtrate may be approximately 10 m$^3$/hour, the individual yields being approximately 7.35 m$^3$/hour in the pocket dewatering stage, about 1.35 m$^3$/hour in the drum dewatering stage and approximately 0.3 m$^3$/hour in the high-pressure plate dewatering stage. Since these quantities of filtrate are yielded separately, it is very advantageous to recycle the small quantities of low-quality filtrate from the high-pressure dewatering zone and even from the medium-pressure dewatering zone, with the extra advantage that the filtrate may also contain flocculant, so that the quantity of flocculant added to the feed sludge can be reduced.

The advantageousness of the process according to the invention will be further described briefly with reference to a practical example. The starting material is a sludge having approximately 4% solids content and the throughput assumed is 10 m$^3$/hour. In a particularly preferred embodiment of the invention, pressureless pocket dewatering is given in the first stage; practical experiments have shown that an input of 10 m$^3$/hour of sludge having a 4% solids content is converted by the pocket dewatering treatment into a sludge having an approximately 15% solids content, approximately 7.35 m$^3$ of water being removed. At discharge from pocket dewatering—i.e., at entry into the medium-pressure drum dewatering—the feed quantity of sludge is only 2.65 m$^3$/hour and its solids content is 15%. The medium-pressure dewatering can therefore be performed relatively slowly in accordance with the invention and practical experiments have shown that a dewatering to approximately 30 to 40% dry substance can be expected. On the basis of the worst figure of 30%, only about 1.3 m$^3$/hour of sludge, which has a 30% solids content, are yielded at the exit fron the medium-pressure treatment facility. The quantity of filtrate yielded in the medium-pressure stage is therefore approximately 1.35 m$^3$/hour. Given careful estimation, therefore, a minimum solids content of 50% is likely at the discharge from the subsequent high-pressure dewatering zone, the yields being only approximately 0.80 m$^3$/hour of sludge and approximately 0.5 m$^3$/hour of filtrate. The decrease in total quantities which is apparent from the example just given shows clearly that the time for which the pressing means act on the sludge can be varied within wide limits, despite a large throughput, precisely in those of the dewatering stages where such variation is important.

Figure 2:
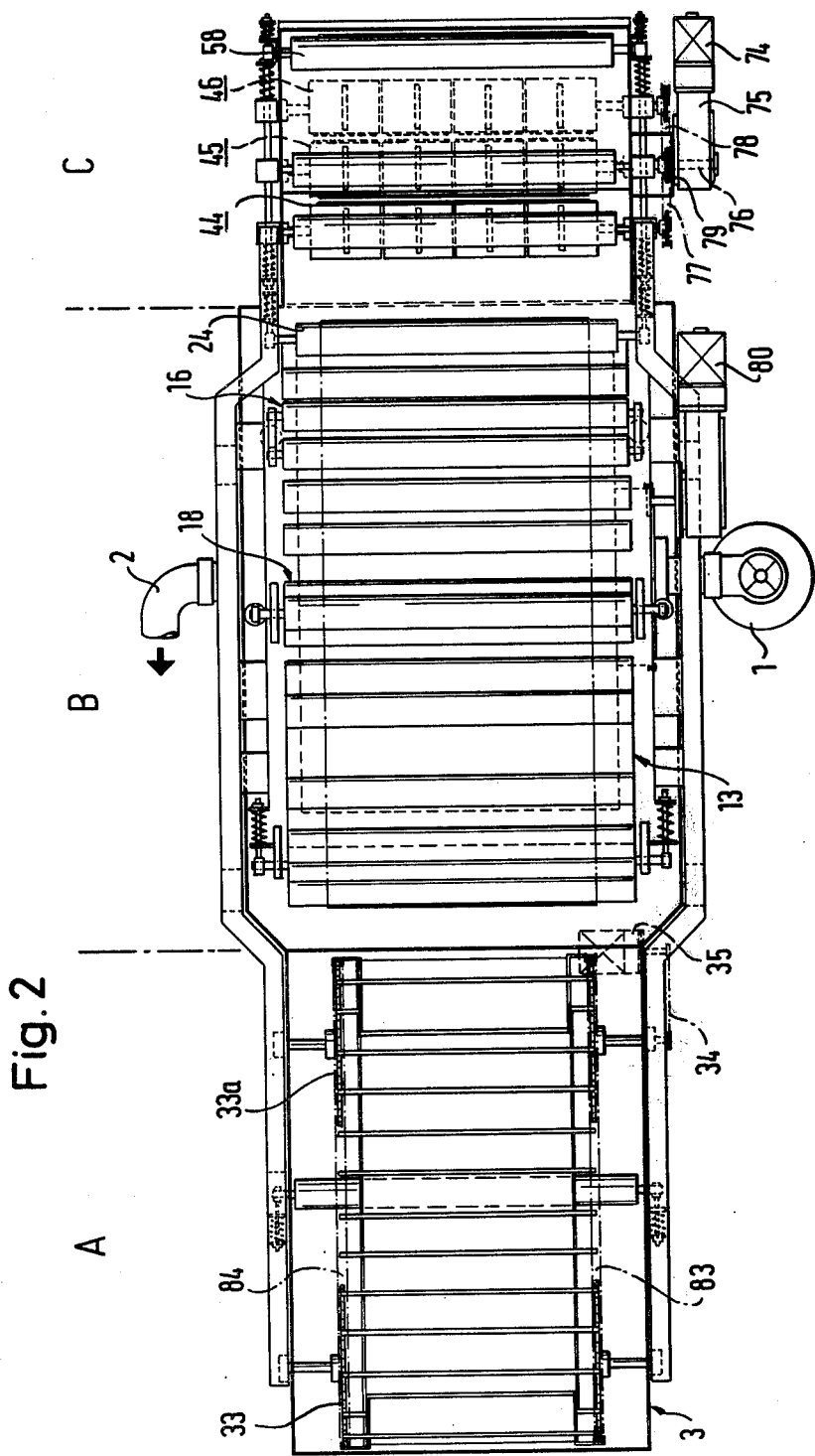
FIG. 2 is a plan view of the apparatus shown in FIG. 1.
Figure 2A:
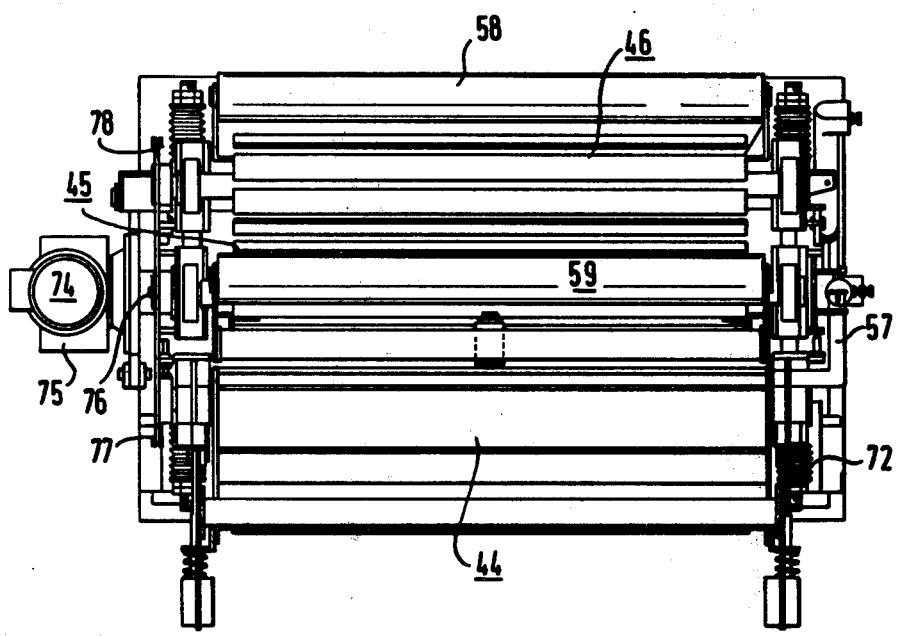
FIG. 2A is a high pressure stage of FIG. 2.
Figure 2B:
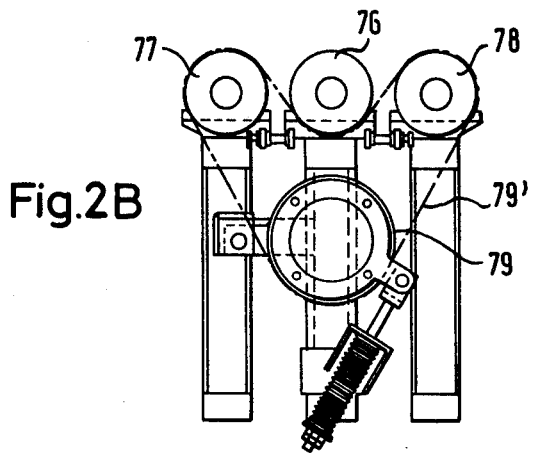
FIG. 2B is an aspect of the drive means of the high pressure stage of FIG. 2.
Figure 2C:
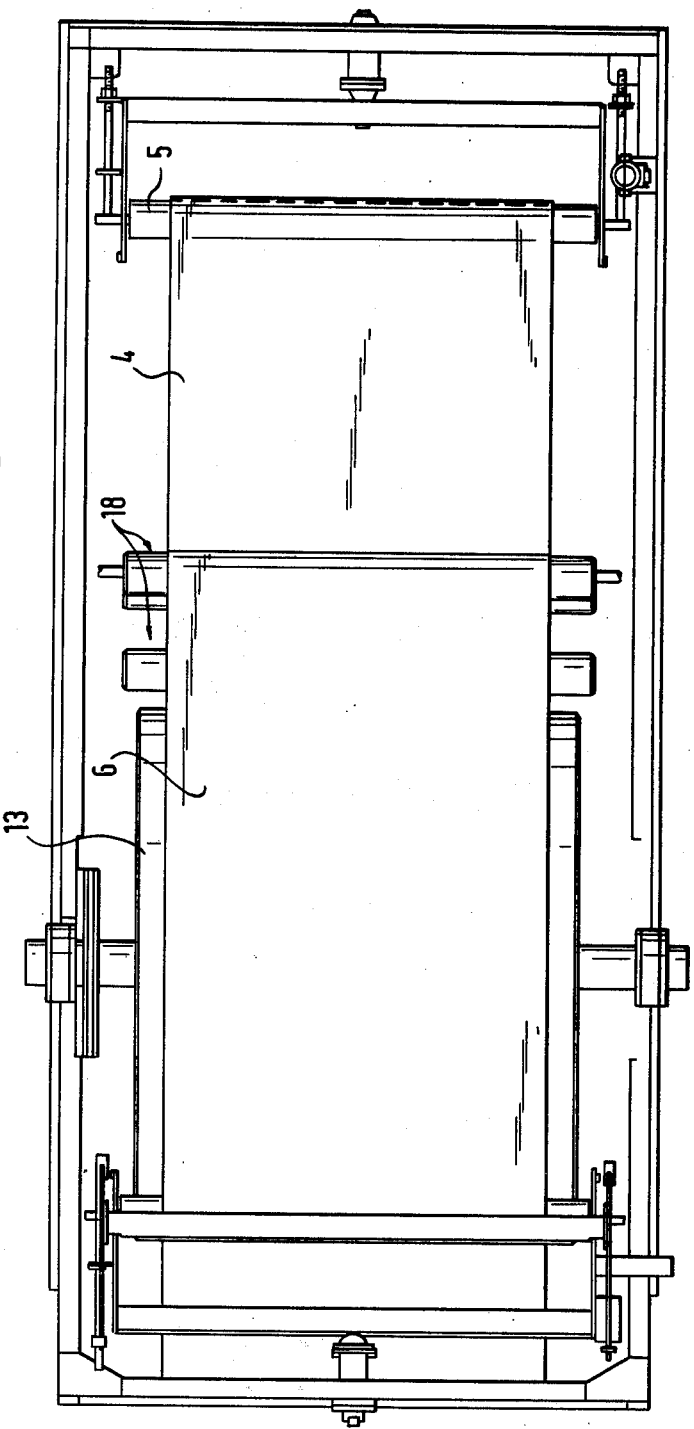
FIG. 2C is a top view of the middle pressure stage of FIG. 2.

It should be noted that in addition to the drawings set forth in this case, reference is made for a description of the pressureless stage of this case to FIGS. 1 and 2 of my copending application U.S. Ser. No. 632,789 now abandoned, SLUDGE PRETREATMENT DEWATERING BASED UPON A CONTINUOUS FILTER POCKETS, the drawings and supporting discussion in the specification being incorporated herein by reference as another form of pressureless stage of the present invention.

In the following discussion, reference to Figures is to the Figures of the present case, and not to my said copending application:

Referring now to the embodiment of the apparatus according to the invention which is designated as FIG. 1, there can be seen an extensible stage designed for a three-stage process. In this form of the invention the three independently operating dewatering phases take the form of a pressureless pocket dewatering stage A, a medium-pressure drum dewatering stage B and a high-pressure plate or platen dewatering stage C$_1$ in FIG. 1 the integers A, B and C are shown separated from one another by chain-dotted lines.

Also visible in FIG. 1 in diagrammatic form is a conical mixing hopper or the like 1 for the raw sludge which is mixed therein with a flocculant; further details of the hopper 1 will be given hereinafter. The mixture of raw sludge and flocculant proceeds after flocculation, through a line indicated by an arrow 2, to a pressureless preliminary dewatering facility 3 which takes the form in FIG. 1 of a rotating pocket filter and which will be described in greater detail hereinafter. From filter 3 the pre-dewatered sludge goes to an outer filter belt 4 of a drum filter press. Filter belt 4 initially runs substantially horizontally over rollers 5 and 5'. An optional additional item is a vibrator for imparting adjustable oscillations or vibrations to belt 4. The vibrator can be of any known kind. There is therefore further pressureless pre-dewatering on the path between the rollers 5 and 5'.

After the roller 5' begins a wedge-shaped entry or feed chamber bounded at the bottom by the outer filter belt 4 and at the top by a second filter belt 6 which, in its passage through a cleaning facility 7, passes around a spring-biased roller 8. The sludge fed to belt 4 from the pocket dewatering phase is therefore received between the two filter belts 4 and 6.

The outer belt 4 and inner belt 6 take the form of a fine-mesh wire fabric; corresponding to the increased pressure operative in drum dewatering, the mesh size of the wire fabric is smaller than the filter width of the pressureless dewatering phase. Also, of course, the drum dewatering stage can have backing belts which are designed for the higher pressure and take the form e.g. of warp wires woven into steel cross-bars.

Tensioners 9, 10 are provided for filter belt 6 and tensioners 11, 12 are provided for belt 4.

The wedge-shaped feed chamber terminates at the place where the belts 4, 6 start to run around a rotating drum 13; in the embodiment shown the drum 13 has a smooth outer generated surface and can be rotated by a motor 15 driving by way of a drive shaft 15 and a gearbox or the like. Extending approximately around one-half of the drum periphery which follows on from the wedge-shaped feed chamber are pressing-roller pairs 16 which adjustable springs 17 bias towards the centre of the drum 13. Only two such pairs 16 are shown completely in FIG. 1, the remainder being indicated only in diagrammatic form. The sludge taken up between the filter belts is therefore given a milling pressurizing between the pairs 16 of pressing rollers and the outer periphery of the drum 13.

Disposed in the direction of rotation and around that part of the drum outer periphery which follows on from pairs 16 of pressing rollers are further pressing-roller groups 18 in the form of groups each consisting of three rollers. Those roller pairs of the groups 18 which are relatively near the drum 13 operate similarly to the roller pairs 16 and are also biased towards the centre of the drum 13 by adjustable springs 19. The extra roller 20, which is so disposed above the other pair as to bound an equilaterial triangle, is biased towards the drum centre through the agency of a separately adjustable spring 21.

As can be seen, the two sludge-receiving belts 4, 6 run through around the periphery of the drum 13 below the roller pairs 16 and roller groups 18, and after passing over as much of the drum periphery as possible the belts 4, 6 are deflected by a roller 22 which also serves as jockey, whereafter the two belts 4, 6 move, in the opposite direction to drum rotation, between the extra roller 20 and the roller pair therebelow, the sludge therefore being given further milling. The further milling is substantially the termination of the medium-pressure dewatering treatment. After leaving the final nip below a roller 20 the inner belt 6 passes around a deflecting roller 24 and over the tops of the extra rollers 20 to return to the beginning of the wedge-shaped feed chamber. To ensure that the belt 6 does not entrain sludge at the roller 24 when reversing, a doctor or scraper device 23 is also provided. The outer filter belt 4 has a deflecting roller 26 which also has a doctor or scraping device 25 and which in the view of FIG. 1 is displaced to the right, since the roller 26 is also the place at which the sludge leaves the medium-pressure facility, embodied by the drum filter press, for transfer to the high-pressure dewatering stage. The outer belt 4 then goes around another spring-biased deflecting roller 24 and the outsides of the pressure roller pairs 16, in the opposite direction to the direction of rotation of drum 13, and via cleaning facility 28, to return to the roller 5 which has the belt-tension facility 11.

Before a detailed description is given of the high-pressure stage C, further details will be given about the embodiment of the pressureless pocket preliminary dewatering facility as shown in FIG. 1.

As can be seen in FIG. 1, the pressureless preliminary dewatering stage 3 takes the form of a rotating belt pocket filter designed, according to its active filter area, either for high filtering capacity or for high end product dry contents. Disposed in casing 29 of filter 3 is a rotating conveying belt 30 having filter pockets 31 whose walls are made of a filter material 32 or of perforate metal sheet; belt 30 runs at both ends around sprocket bucket wheels 33, and 33a, the latter wheel being one of which is driven by a driving motor 35 via a drive 34.

As will be described in greater detail hereinafter, flocculated sludge enters the various pockets of the filter, for dewatering, through an inlet 33a in casing 29 and as indicated by an arrow 36; in the view shown in FIG. 1, the pocket belt moves from left to right. The water leaving the filter pockets is collected by a plate 36a and removed laterally. At the lowest point of the wheel 33a which is on the right in FIG. 1, the dewatered sludge starts to be placed on filter belt 4.

The left-hand wheel 33 need not be a sprocket wheel like the right-hand wheel 33a but can be devised like a cage whose bars engage between the various pockets 31 as the belt passes around the wheel 33a. Near the left-hand wheel 33 is a sprayer 38 for washing out the filter walls of the pockets 31; conveniently, the sprayer 38 is secured to the underside of plate 36a. The resulting washing space is isolated by a wall 39 from the transfer zone between the preliminary facility 3 and the filter belt 4.

The filter apertures in the walls of the pockets 31 are coarser than the apertures in the belts 4, 6. Also, the conveying speed of the facility 3 can be varied independently and steplessly through the agency of the variable-speed motor 35 so that the process according to the invention may be carried into effect advantageously.

The high pressure stage of the process according to the invention and of the apparatus shown, such stage having the general reference C in FIG. 1, is conveniently embodied in the present case by a facility 40 which can be called a plate or platen belt press.

For the sake of maximum end-product dry content, the press 40 representing the high-pressure stage of the process according to the invention in its three-stage embodiment is required to apply a very high and steady pressure to the sludge which as early as its departure from the medium-pressure stage of the treatment has a comparatively high solids content and which is yielded to the final high-pressure stage in a fairly solid general condition. The sludge transferred at the scraper or doctor 25 from the medium-pressure stage to the high-pressure stage C is fed into the press 40 downwardly between an outer filter belt 41 and an inner filter belt 42. In adaptation to the altered overall condition of the sludge, the mesh size or perforation of the belts 41, 42 is smaller than that of the belts 4, 6 of the preceding medium-pressure treatment stage.

The outer belt 41 runs over a deflecting roller 43 and enters the first nip downwardly between two of three plate or platent belts 44, 45, 46 which wh will be described in greater detail hereinafter; the outer belt 41 then runs over a combined deflecting roller and tensioner 47, then moves upwards through the next nip between the belts 45 and 46. At the top reversal point of the belt 46 the belt 41 runs over an outwardly displaced deflecting roller 48 which also has a scraper or doctor 49 and which represents discharge point of the end-product dewatered sludge. Preferably, in the embodiment shown the discharge point or place is high up, viz., very close to the top end of the apparatus, with the advantage that the discharged dry sludge can be transferred directly into containers or trucks, so that the apparatus according to the invention need not be disposed on raised foundations and can readily be accommodated in existing works buildings.

If a relatively high solids content is required, the high-pressure stage 40 can be amplified as required; however, merely to retain the advantage of the discharge place being positioned high up, it is preferable to add two extra plate or platen belts, with appropriate guidance of the filter belts, with each extension stage. Another possibility is for complete high-pressure stages constructed as shown to be provided consecutively on the unit construction principle, so that the discharge place shown in FIG. 1 is also the place of transfer to an identical high-pressure plate press.

From roller 48 the belt 41 descends over another deflecting roller 50 having a tensioner 51, then enters a washer 52 where there is another deflecting roller 53 with its tensioner 54, whence the belt 41 returns upwards to the roller 43.

The "inner" filter belt 42 also descends into the first nip between the belts 44 and 45, runs down around the roller 47 and then up through the second nip between the belts 45 and 46. At the place of discharge a deflecting roller 55 which also has a scraper or doctor 56 is provided above the deflecting roller 48 of the outer filter belt 41. From roller 45 the belt 42 rises into a washer 57 where there are two more deflecting rollers 58, 59 with their respective tensioners 60, 61. The exit of the filter belt 42 from the washer 47 is disposed substantially above the entry into the first nip.

Figure 8A:
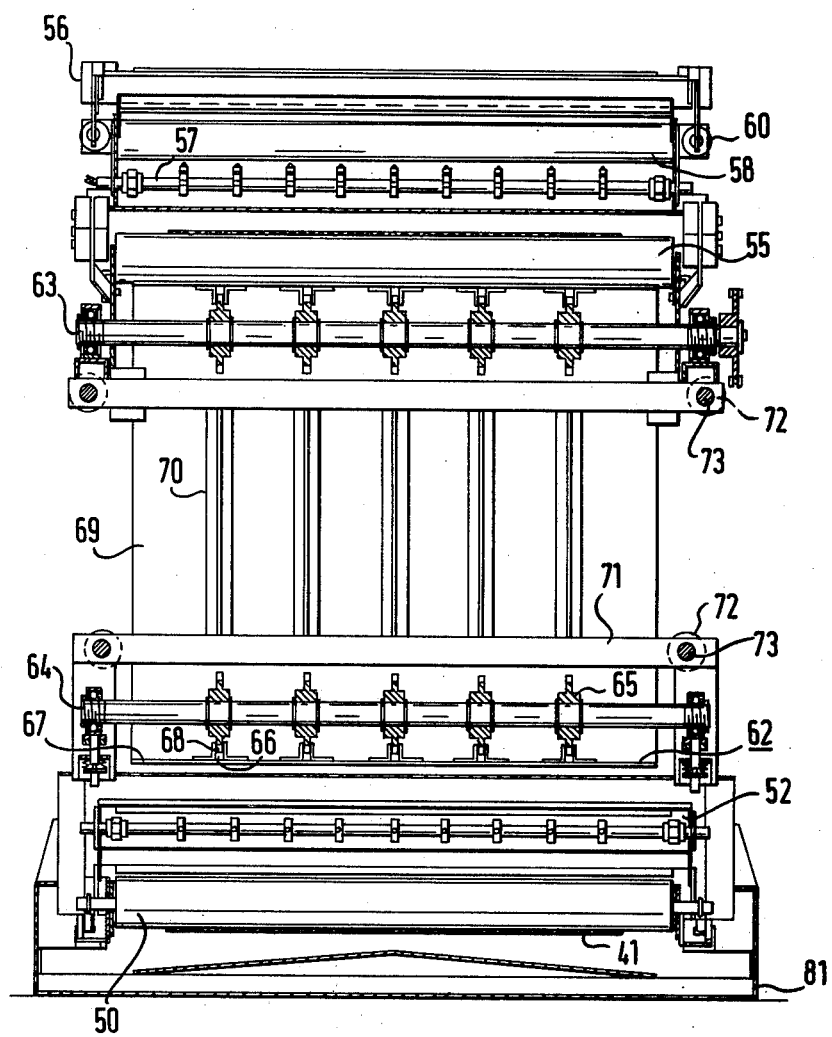
FIG. 8A shows details of the drive of the view shown in FIG. 8.
Figure 8B:
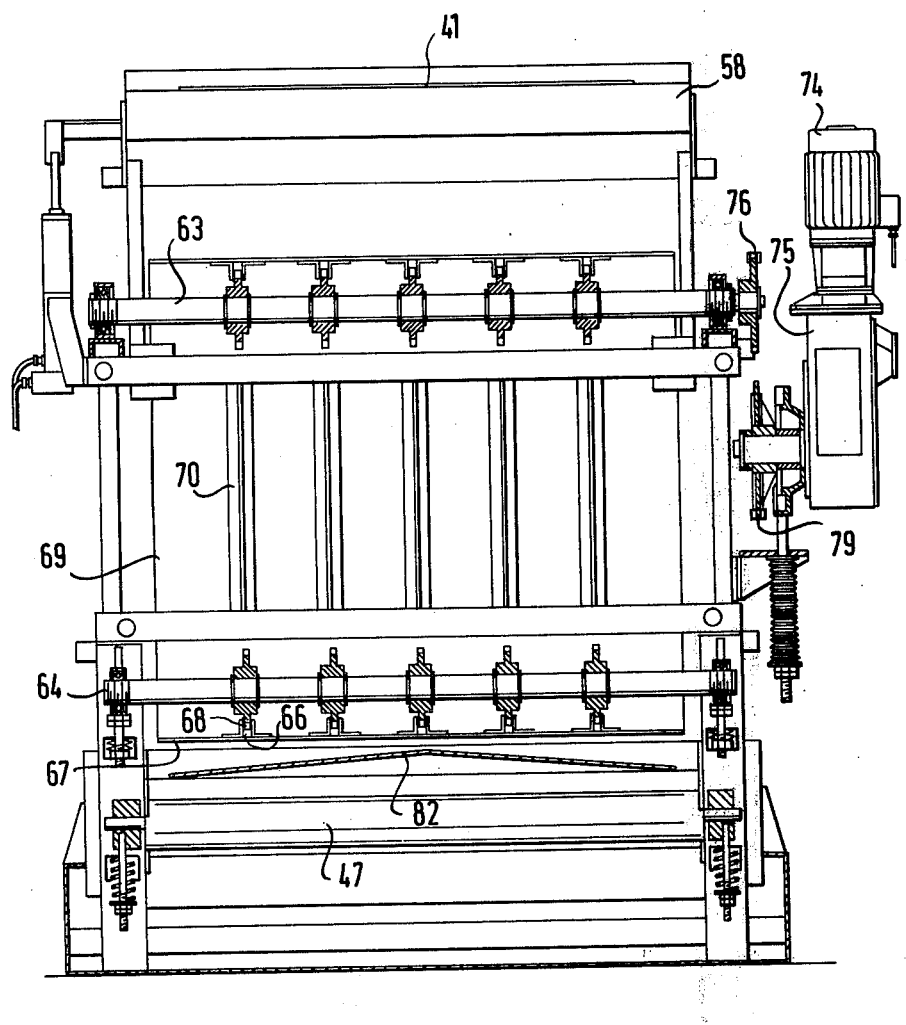
FIG. 8B is a section in a different plane corresponding to FIG. 8.

Further details of a high-pressure stage embodied as a belt press of the kind described can best be gathered from FIGS. 1, 2 and 8.

In the embodiment shown, the facility applying the highest and steady pressure to the filter belts 41, 42 receiving the sludge between them takes the form of three rotating plate or platen belts 44, 45, 46; since each such belt is of substantially identical construction, just one of them will be described with reference more particularly to FIG. 8. A plate or platen belt of the kind outlined comprises pivoted together plates 62 rotating around two spindles 63, 64. For constructional reasons the plates can be further subdivided in the peripheral direction so that the total width of the resulting press is formed by a number of rotating relatively thin plate belts, as can be seen in FIG. 8. In the embodiment shown, sprockets 65 each engaging in a chain 66 and provided to a number corresponding to the discrete elements 62 are secured to the spindles 63, 64. The plates 67 of each plate belt 62 are secured to the links of the chains 66 and are preferably in the form of perforate sheet metal elements or elements made of similar materials. Also, on one or both sides the links of each chain have rollers 68 which, on the pressing side of such a plate belt—i.e., on the side near the pressing nip between two plate belts—run along a pressing plate 69 provided in this region. The plate 69 can have separate guides or rail-like thickenings 70 for the rollers of each chain. The pressing plate 69 is biased by pressure towards the associated nip through the agency of cross-bearers 71 disposed at intervals in the space between the reversing stations embodied by the sprockets 65.

The pressurising can be provided through the agency of either hydraulic or pneumatic pressure cushions or through the agency of reciprocating hydraulic actuators of the like. However, for the sake of simplicity and construction, the pressurising in the embodiment shown is provided by compression springs 72 which are adjustable to allow for possible sagging or the like. In the embodiment shown in FIG. 1, the two outer belts 44, 46 are biased towards the central and substantially fixedly mounted belt 45, the compression springs 72 being disposed on both sides of the two outer belts 44 and 46 on through bolts or the like 73 extending through the cross-bearers 71.

As can be gathered more particularly from FIG. 2, the plate belts 44–46 are driven by a common drive in the form of a driving motor 74 and associated gearbox 75, motor speed also being steplessly variable. The gearbox drive shaft 76 drives the central and substantially stationary plate belt 45 directly; the drives for the two outer belts 44 and 46 are preferably by way of chain drives 77, 78 driven off a sprocket 79 on the drive shaft 76 to make allowance for the movements of the belts 44 and 46.

To complete the description, additional backing belts which correspond to the pressure requirement can be provided for all the filter belts 4, 6 and 41, 42. It may also be necessary to provide additional drives for the filter belts or the backing belts.

FIG. 2 also shows a driving motor 80 for the drum 13 of the drum filter press of the medium-pressure stage B.

As can be gathered from FIGS. 1 and 8, the filtrate yielded in the high-pressure stage C is collected in casing 81; between the roller 47 and the bottom reversal point of the belt 45 there is an extra collecting trough or channel 82 which serves, by virtue of its downward inclination in both directions, to combine the filtrate yielded in this region with the rest of the filtrate collected and which prevents the filtrate from returning on the roller 47 into the expressed sludge.

Figure 4:
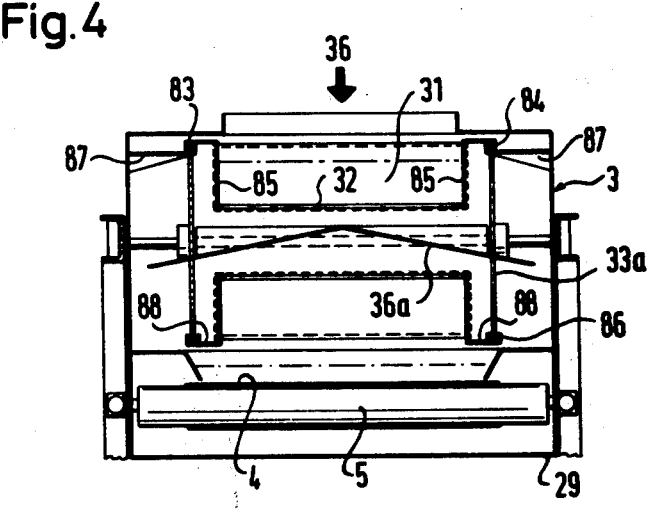
FIG. 4 is a sectioned view of the apparatus of FIG. 1 on the line IV—IV.
Figure 10:
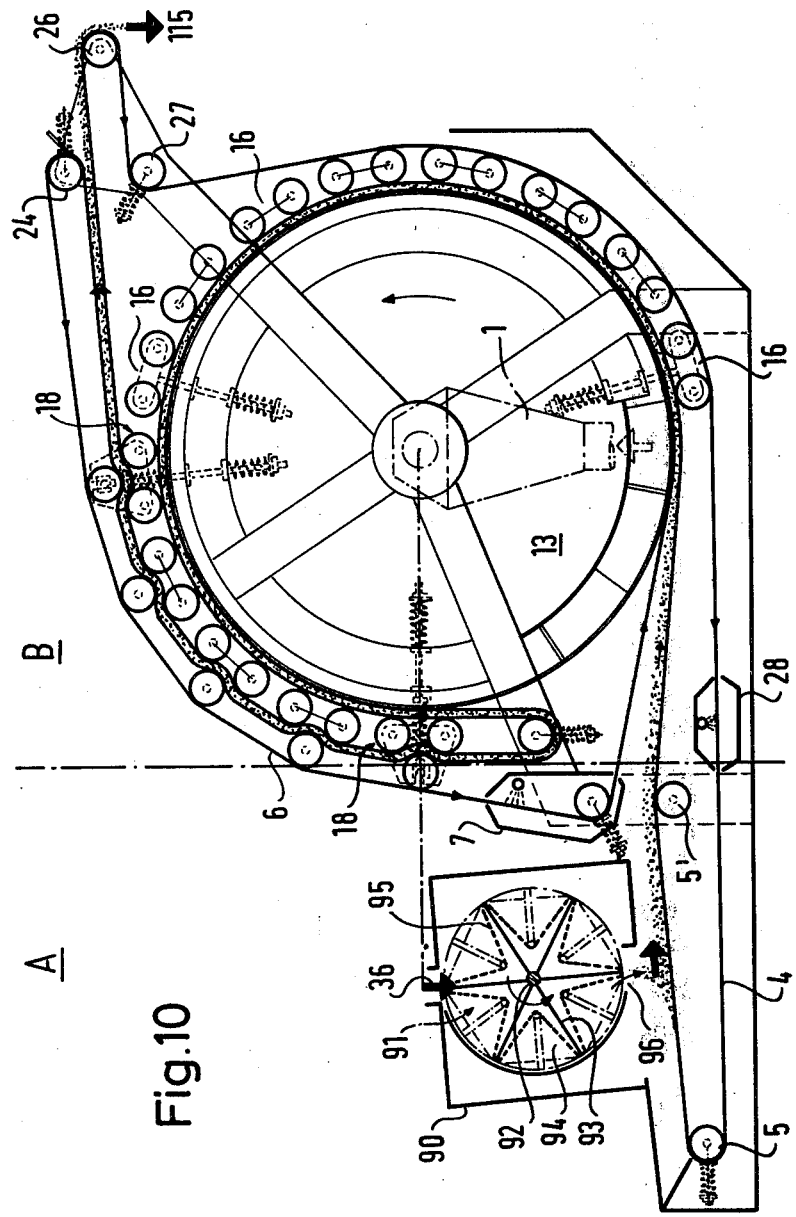
FIG. 10 is a depiction of the drum filter press according to FIG. 9 together with a first embodiment of a pressureless preliminary dewatering facility.

Details of the pressureless filter pocket dewatering facility hereinbefore mentioned can be gathered from FIG. 4 in association with FIG. 1, while FIG. 10 shows a second embodiment of the facility. As can be gathered more particularly from FIG. 4, the filter pockets 31 having walls made of a filter material or of perforate sheet metal are suspended, also preferably in the form of a conveyor belt or plate belt, on endlessly rotating side chains 83,84 which reverse around sprockets 33,37. The filter pockets 31 are so secured to the chains by means of bars 85 or the like as to be in cross-section substantially triangular. This filter pocket belt construction leads more particularly to a very simple kind of construction for guiding and mounting. Preferably, the links of the two chains 83,84 have on both sides rollers 86 which, in the section between the reversing sprockets 33 and 37, run in guides 87 in the top run and in guides 88 in the bottom run, taking the full weight in the top run of the sludge-filled pockets.

As can be gathered from FIG. 4, the collecting plate 36 in cross-section resembles a pitched roof, so that the filtrate accumulating is removed laterally.

The embodiment of pressureless filter pocket dewatering as shown in FIG. 10 a simplified embodiment which is of reduced overall size and which may be of use in cases in which either a sludge having a relatively high solids content is present or requirements as regards end-product solids content are not particularly severe. The embodiment which is shown here and which will subsequently be referred to separately in combination with the drum filter press is embodied by a bucket wheel or drum or the like 91 which is enclosed in a casing 90 and which is driven anticlockwise by way of shaft 92; conveniently, the same is embodied after the fashion of a hollow shaft on which walls 93 of the cells or buckets are secured. Disposed in the wedge-shaped spaces bounded by the walls 93 are filter pockets 94 which are also of wedge-shaped cross-section and which take the form of filters or filter belts or perforate sheet metal members of coarser mesh than the filter belts 4, 6 and which can be axially bounded at their side walls by the same filter material. In the diagrammatic view of FIG. 10 the filters have the reference 95.

As in the embodiment shown in FIGS. 1, 2 and 4, the effective length of the drum 91 corresponds to the width of the filter belts 4, 6 and the drum 91 is driven by a separate motor which is not shown and whose speed is preferably steplessly variable. The wheel or drum 91 is completely enclosed in the casing 90 and, as in the case of the embodiment shown in FIG. 1, the discharge point 96 of the drum 91 is disposed above the filter belt 4; the same rises slightly in this zone to facilitate discharge of the filtrate yielded during the additional preliminary dewatering occurring between the rollers 5 and 5'.

FIGS. 3 and 5 to 7 show a particularly preferred embodiments of the drum filter press forming the medium-pressure stage. The special feature of the embodiments shown in FIGS. 3 and 5 to 7 is that the interior of the drum 13 is devised as an additional reaction chamber for sludge and flocculant. Since there are of course basically two kinds of flocculant, the difference between them being their reaction times with the sludge—i.e., fact reacting and slow reacting flocculants, according to the invention, so that both kinds of flocculant may be used the drum interior is embodied as an after-reaction chamber, since the drum interior is available without additional expense and has to be driven anyway.

Accordingly, drum 13 has an interior 99 closed by side walls 97, 98; extending in the interior 99 over the whole width thereof are transverse walls 100 which are inclined forwards in the direction of drum rotation and thus bound circulating or conveying pockets 101.

The drum 13 is also of double-skinned construction, an inner skin 102 bounding the reaction chamber 99 while an outer skin 103 extending around the inner skin 102 is made of perforate sheet metal or the like and can thus receive the filtrate yielded during the medium-pressure dewatering treatment. To remove the filtrate which penetrates between the two skins 103 and 102 during the dewatering treatment, the cylindrical space bounded by the two skins 102, 103 is subdivided at regular intervals around the periphery by transverse walls 104 disposed at an inclination to the direction of rotation, thus also ensuring that the filtrate yielded is removed from one side of the cylindrical space (Cf. FIG. 7).

Figure 3A:
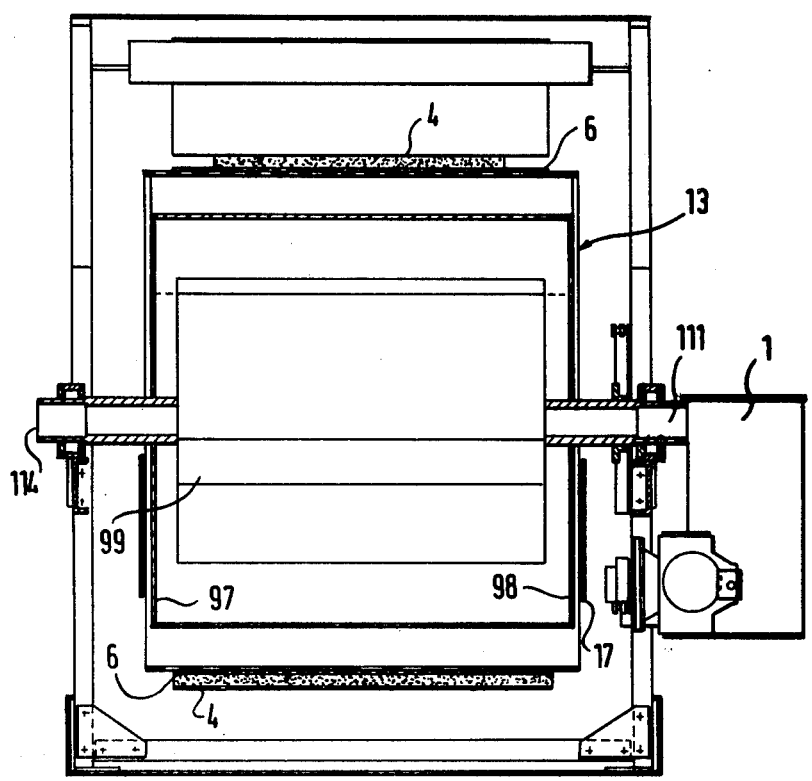
FIG. 3A is a top view of FIG. 3, partially drawn in section.
Figure 3:
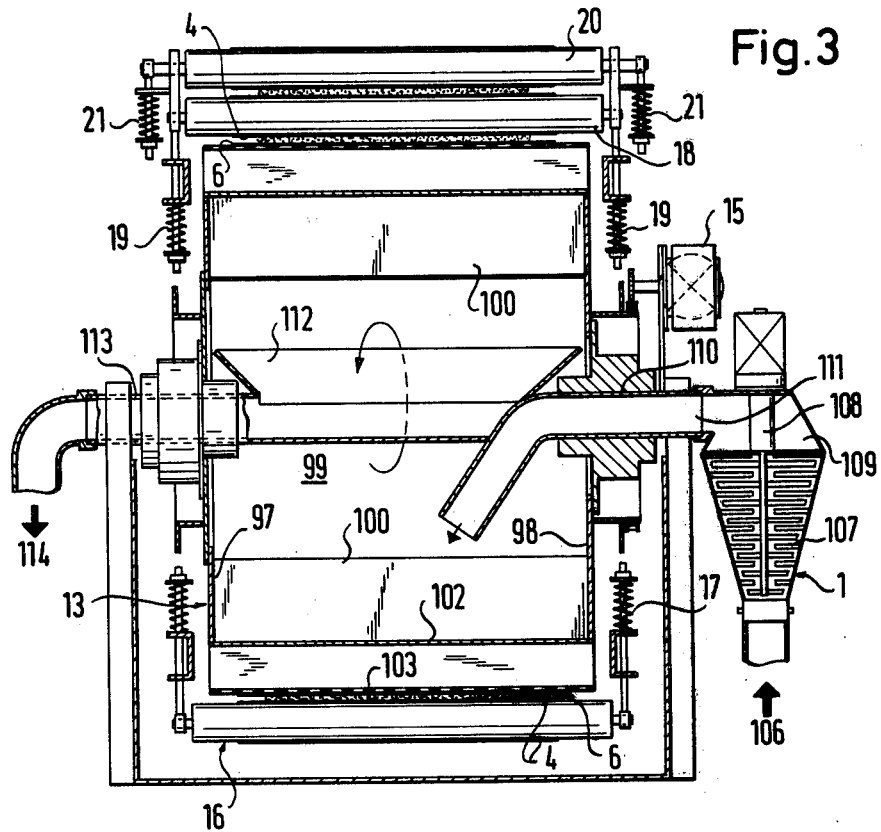
FIG. 3 is a sectioned view of the apparatus shown in FIG. 1 on the line III—III.
Figure 6:
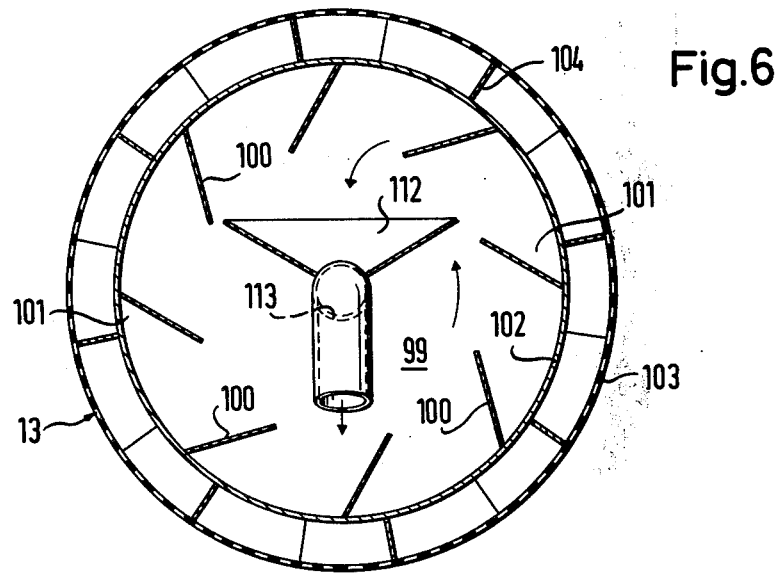
FIG. 6 shows a second form of the drum as an alternative to FIG. 5.
Figure 5:
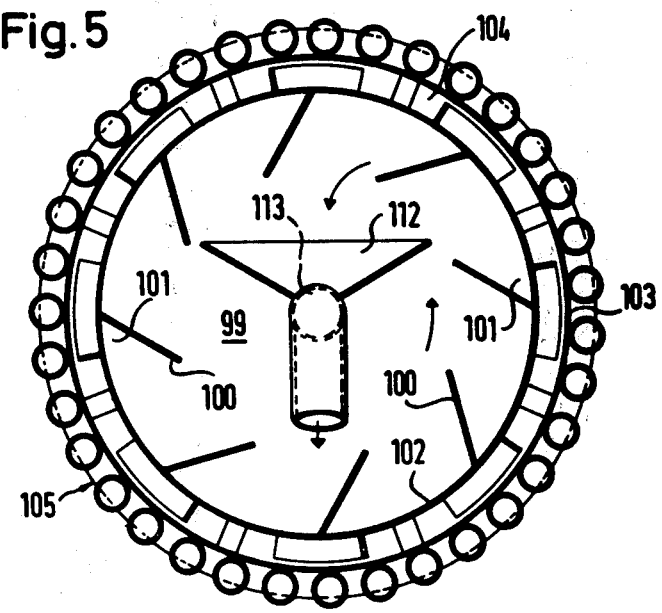
FIG. 5 is a sectioned side elevation of a first form of the drum of a drum filter press provided as a medium-pressure stage.

The embodiment of a drum shown in FIGS. 3, 6 and 7 has a plain outer skin 103, but the embodiment shown in FIG. 5 also has on the outer skin 103 a roller cage 105 over which the filter belts 4, 6 run, corresponding outer pressing rollers being provided as in FIG. 1. With this feature the drum can be driven in the opposite direction to the direction of movement of the belts 4, 6 to provide, should the special nature of the sludge to be dewatered to require it, a very intensive milling action due to the rollers, which are in contact with one another by way of the filter belts and of the layer of sludge therebetween, performing an undulating motion.

As can be gathered from FIG. 3, raw sludge for treatment which is delivered from a sludge-dispensing pump (not shown), is introduced into the conical mixing hopper 1 at a place 106; disposed in hopper 1 is an agitator 107 which is driven by a hollow shaft 108. A flocculant is supplied therethrough into hopper 1 to be mixed with the raw sludge, and the mixture of sludge and flocculant rises in the hopper 1 and at the top thereof enters a reaction chamber 109 which in the embodiment shown is embodied by the top end of the hopper 1. The mixture of sludge and flocculant goes from chamber 109 through hollow shaft 110 of drum 13 and through a line 111 into reaction chamber 99, with the result that, since the drum 13 normally rotates slowly, extra time becomes available for an after-reaction between the sludge and the flocculant. Through the agency of the pockets 101 bounded by the transverse walls 100, the sludge is then raised to the highest part of the drum 13 and collected by a collecting trough 112 disposed near the drum central axis. Trough 122 discharges into a line 13 which extends through hollow shaft 110 of the drum 13 and from which the mixture of flocculant and reacted sludge is removed on the opposite side of the drum 13 at a place 114. The sludge then goes, in the embodiment shown in FIG. 1, to the pressureless filter pocket dewatering stage.

On the basis of the embodiments hereinbefore described of a possible extension stage of the apparatus according to the invention, there are in this case three independently operating dewatering phases provided by the sections A, B and C. Each of these independently operated phases—the pressureless pocket dewatering A, the medium-pressure drum dewatering B and the high-pressure plate dewatering—makes it possible to use the best filter size to suit the over all condition of the sludge. Also, and as already stated in the example just given, since the total quantity to be treated decreases continuously, if there is a high throughput of sludge to start with, the time for which the sludge is given pressure treatment, together with the pressure itself, can increase from one stage to the next without any reduction in throughput, since meet of the reduction in bulk occurs during the pocket dewatering stage. This feature is of special importance precisely in the case of the steady pressure in the high-pressure plate dewatering stage. Consequently, treatment can be given in each of the dewatering stages with a special filter belt running at the optimum speed for the particular stage concerned in the light of the quantity still to be dewatered; optimum pressure conditions can also be provided.

Another factor which is considered to be of importance for the invention, although not shown in the drawings for the sake of simplicity, is for the filtrate to be yielded separately in the various stages, so that fairly heavily soiled filtrates can be returned to the process and, since they contain surplus flocculants, can even help to improve process economy. Because of the pressureless preliminary pocket dewatering, the resulting slight increase in the total quantity to be dewatered is virtually negligible. Another feature which is not shown in the drawings is that e.g. the very clean filtrate yielded by the pressureless pocket dewatering stage can be used as a cleaning agent for all the cleaning facilities. The lines and pumps needed for cleaning are not shown in the drawings.

Figure 12:
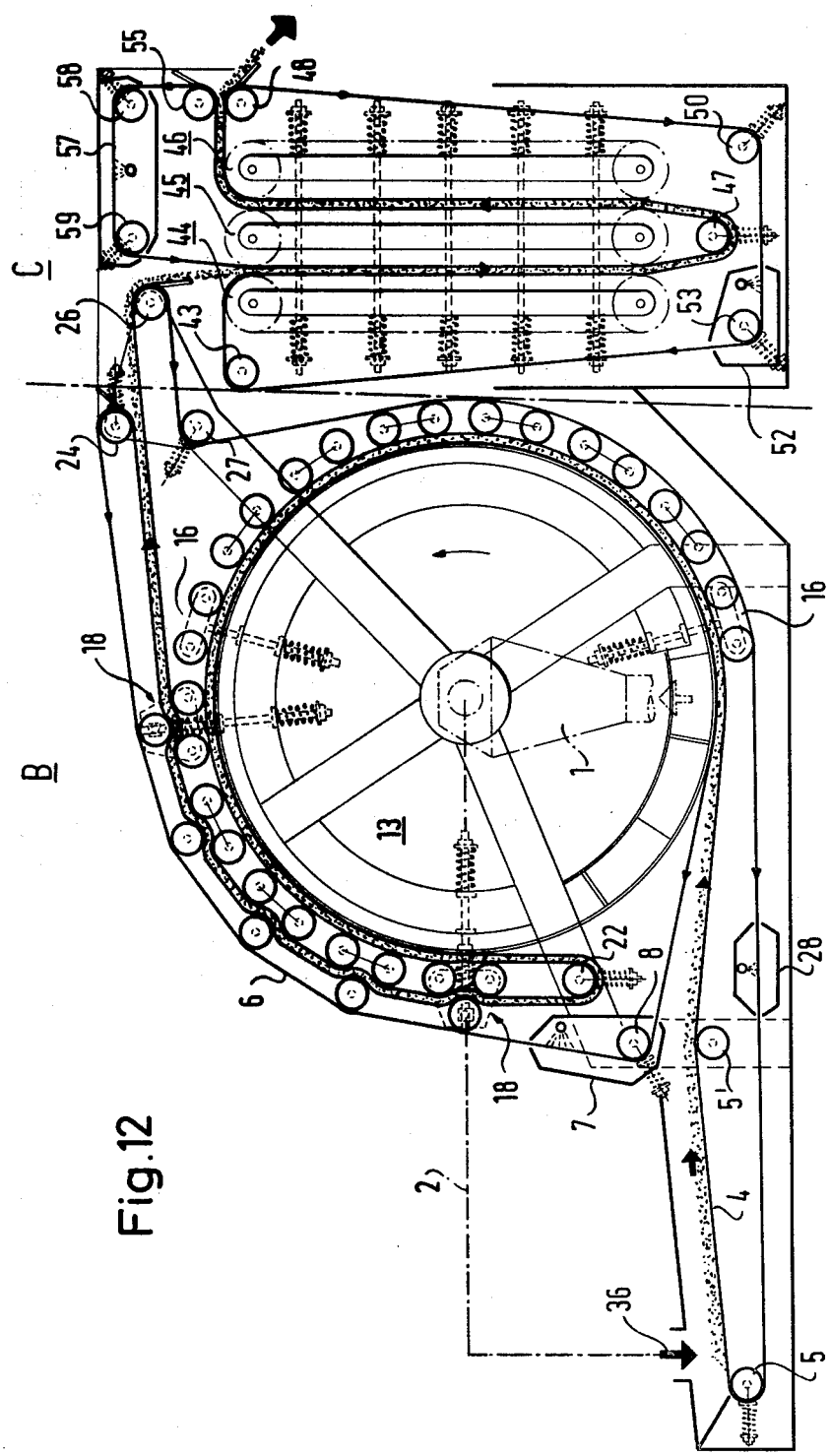
FIG. 12 shows an extensible stage of the apparatus according to the invention, such stage comprising high-pressure dewatering and medium-pressure dewatering.

Also, and more particularly in the case of the three-stage embodiement shown in FIG. 1, since each of the units used can operate completely independently of the others, further advantages arise from the fact that such units can be used in a very wide variety of combinations or because, depending upon requirements, additional similar units can be used before or after the units shown. FIGS. 9 and 12 show various possible combinations of such a kind, starting from an extension stage of the kind shown in FIG. 1; however, in the embodiment shown in FIG. 1, a second pressureless pocket preliminary dewatering facility of even more adapted filter size and speed can be provided before the units shown, and one or more high-pressure stages having appropriately adapted filter belts and speeds can be provided after the high-pressure unit shown.

In FIG. 9 only the medium-pressure stage B is shown, for cases where the sludges being treated are very simple to dewater and requirements as to end-products solids contents are fairly easy; in FIG. 9 such stage, similarly to the embodiment shown in FIG. 1, has its discharge place 115 high up. For further constructional details reference should be made to the description of the embodiment shown in FIGS. 1, 2, 3 and 5 to 7.

The combination shown in FIG. 10 is preceded by the small model pocket preliminary dewatering facility hereinbefore described, so that most of the water present in the sludge is in this case removed in the pocket dewatering phase and the drum filter press can be operated at optimum speed and filter belt mesh size.

Figure 11:
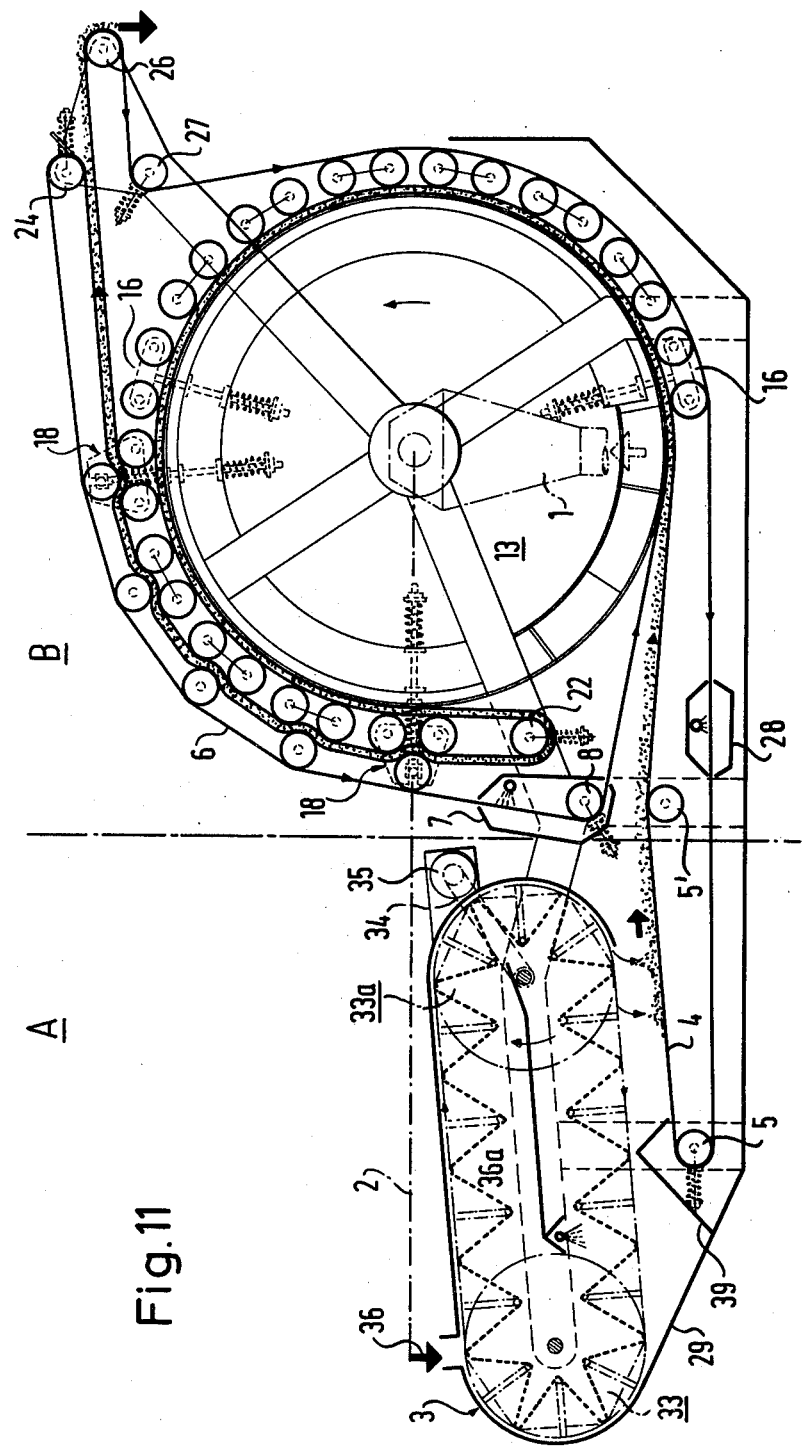
FIG. 11 is a view similar to FIG. 10, with a second form of the pressureless preliminary dewatering stage.

FIG. 11 shows a combination similar to FIG. 1 except that, in accordance with the sludge for treatment and with end-product solids contents, no high-pressure stage is provided.

FIG. 12 shows another possible alternative combination in which there is no preliminary dewatering and a medium-pressure stage B is followed by a high-pressure stage C.

As will be apparent from the foregoing, the invention makes it possible for the first time to make allowance for changes in the overall condition of the sludge during its dewatering treatment.

It is considered to be of great importance for the invention to combine pressureless pocket dewatering with high-pressure plate dewatering in accordance with the stages A and C described, since it then becomes possible for the prior art intermittently operating chamber filter press to be completely replaced by a very low cost continuously operating plant.

It should be noted that the method and apparatus may also be used by substituting for the instant system of filter pockets in the pressure free stage a filter pocket system where the filter pockets are compressed, this different type of filter pocket system being disclosed in my copending application filed on even date herewith, Ser. No. 632,691, now U.S. Pat. No. 4,059,527, entitled IMPROVED PRETREATMENT FILTER PRESS DEWATERING SYSTEM. In addition, yet a further refinement of the overall invention disclosed in the present case relates to embodiments which incorporate improvements in the present system, particularly including the use of the variable pockets in the just mentioned case Ser. No. 632,691, now U.S. Pat. No. 4,059,527. Examples of such further refinement are found in my copending application filed on even date herewith, Ser. No. 632,788, now abandoned, entitled IMPROVED VARIABLE UNIT PREWATERING TREATMENT WITH CONSECUTIVE, INDEPENDENT STAGES.

What is claimed is:

1. An apparatus for the removal of water from sludge comprising
    means for supplying sludge to be dewatered,
    a first dewatering stage coupled to said means for supplying sludge and comprising a rotating filtering medium for receiving said sludge and straining out an appreciable quantity of water therefrom by gravity pressure,
    a second dewatering stage coupled to the output of said first dewatering stage and comprising a first pair of endless rotating filter belts receiving between them the sludge output of said first dewatering stage, a series of pressure rollers, and a rotary drum against which said first filter belts are pressed by said series of pressure rollers, the pressure applied to the sludge by said pressure rollers being greater than gravity pressure, and
    a third dewatering stage coupled to the output of said second dewatering stage and comprising a second pair of endless rotating filter belts and at least two rotating platen belts pressure biased towards one another and defining nips between them through which said second pair of filter belts pass, said second pair of filter belts receiving the output sludge from said second dewatering stage prior to their entry between said platen belts, said platen belts applying pressure to the sludge received from said second dewatering stage which is higher than the pressure applied to the sludge in the second dewatering stage by said pressure rollers, each of said first, second, and third dewatering stages retaining the sludge passing therethrough for successively longer periods of time.

2. An apparatus of claim 1 wherein said first pair of endless rotating filter belts is independent of said second pair of endless rotating filter belts and both said first and second pairs of endless rotating filter belts are independent of said rotating filtering medium.

3. An apparatus for dewatering sludge as in claim 1 wherein said rotating filtering medium of said first stage comprises rotating filter pockets.

4. An apparatus of claim 3 wherein three platen belts are provided in said third dewatering stage defining two parallel nips and said second pair of endlessly rotating filter belts pass through said two parallel nips, and the two outer platen belts are pressurized towards engagement with the central and stationary platen belt.

5. An apparatus of claim 3 wherein the pressure biasing of the platen belts towards one another is provided by springs.

6. An apparatus of claim 3 wherein the pressure biasing of the platen belts towards one another is provided by hydraulic cylinders.

7. An apparatus of claim 3 wherein the pressure biasing of the platen belts towards one another is provided by pneumatic or hydraulic pressure cushions.

8. An apparatus of claim 3 wherein the platen belts are mounted on rollers having spindles and a pressure biasing means is provided acting on said spindles to bias said platen belts towards one another.

9. An apparatus of claim 3 wherein each platen belt runs over two reversing rollers and a continuous pressing plate or pressing support is positioned between the reversing rollers for each platen belt on the pressing side thereof.

10. An apparatus of claim 3 wherein the nips bounded by the platen belts and said second pair of filter belts passing through said nips are disposed substantially vertically.

11. An apparatus of claim 3 wherein said apparatus comprises cleaning means for said second pair of filter belts of the platen press.

12. An apparatus of claim 3 wherein the outlet of said first dewatering stage comprising said rotating filter pockets is disposed at a level above the level of a preliminary dewatering section of said second dewatering stage.

13. An apparatus of claim 3 wherein a chamber is provided upstream of said first dewatering stage, said chamber being equipped with a forcing means for mixing sludge with a floculant, the output of said chamber being coupled to said first dewatering stage.

14. An apparatus of claim 13 wherein said chamber is provided inside said rotary drum of said second dewatering stage.

15. An apparatus of claim 3 wherein said rotating filter pockets are disposed above a rotating drum.

16. An apparatus of claim 3 wherein said rotating filter pockets are a part of a belt.

17. An apparatus of claim 3 wherein one of said second pair of filter belts is disposed below the discharge point of said filter pockets to receive sludge strained by said filter pockets.

* * * * *